US011222216B2

(12) United States Patent
Maeda et al.

(10) Patent No.: US 11,222,216 B2
(45) Date of Patent: Jan. 11, 2022

(54) CROSSWALK DETECTION DEVICE, METHOD AND PROGRAM

(71) Applicant: NIPPON TELEGRAPH AND TELEPHONE CORPORATION, Tokyo (JP)

(72) Inventors: Atsuhiko Maeda, Musashino (JP); Manabu Yoshida, Musashino (JP); Yuki Yokohata, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,002

(22) PCT Filed: Jun. 3, 2019

(86) PCT No.: PCT/JP2019/022017
§ 371 (c)(1),
(2) Date: Dec. 1, 2020

(87) PCT Pub. No.: WO2019/235433
PCT Pub. Date: Dec. 12, 2019

(65) Prior Publication Data
US 2021/0216791 A1 Jul. 15, 2021

(30) Foreign Application Priority Data
Jun. 4, 2018 (JP) .............................. JP2018-107121

(51) Int. Cl.
*G06K 9/00* (2006.01)
*G06T 7/60* (2017.01)

(52) U.S. Cl.
CPC ..... *G06K 9/00798* (2013.01); *G06K 9/00637* (2013.01); *G06T 7/60* (2013.01)

(58) Field of Classification Search
CPC ... G06K 9/00798; G06K 9/00637; G06T 7/60
(Continued)

(56) References Cited

U.S. PATENT DOCUMENTS

2017/0337432 A1* 11/2017 Maeda .................. G01S 13/931

FOREIGN PATENT DOCUMENTS

| JP | 2013210991 A | * | 10/2013 | |
| JP | 2014106703 A | * | 6/2014 | ............. G06T 7/246 |

OTHER PUBLICATIONS

Takahiro Miura et al., Sharing Accessibility Information for People with Disabilities:Analyses of Information Acquired by Field Assessment and Crowdsourcing, The Virtual Reality Society of Japan, vol. 21, No. 2, 2016, pp. 283-294.

* cited by examiner

*Primary Examiner* — Wednel Cadeau
(74) *Attorney, Agent, or Firm* — Harness, Dickey & Pierce, P.L.C.

(57) ABSTRACT

A crosswalk detection device according to an embodiment includes a processor, and the processor configured to perform image scanning processing for scanning aerial image data in unit of window, multiple line segment creation processing for creating a plurality of line segments corresponding to a distance based on a dimension of a crosswalk in any direction within a region scanned in the aerial image data, first calculation processing for calculating an absolute value of a first derivative value indicating a difference in brightness between both ends of the line segment and calculating an average value of the absolute value of the first derivative value for each angle, second calculation processing for calculating an absolute value of a second derivative value indicating a difference between a difference in brightness between a first end and an intermediate point of the line segment and a difference in brightness between the inter- (Continued)

mediate point and a second end of the line segment and calculating an average value of the absolute value of the second derivative value for each angle, and crosswalk determination processing for determining that coordinates of each of the line segments are coordinates of the crosswalk based on a calculation result.

9 Claims, 13 Drawing Sheets

(58) Field of Classification Search
USPC .......................................................... 375/103
See application file for complete search history.

| x | y | direction |
|---|---|---|
| 3040 | 2500 | 90 |
| 3010 | 2510 | 90 |
| 3020 | 2510 | 90 |
| 3030 | 2510 | 90 |
| 3040 | 2510 | 90 |
| 2950 | 2530 | 0 |
| 2960 | 2530 | 0 |
| 2970 | 2530 | 0 |
| 2980 | 2530 | 0 |
| 2950 | 2540 | 0 |
| 2960 | 2540 | 0 |
| 2970 | 2530 | 0 |
| 2980 | 2530 | 0 |
| 3090 | 2530 | 0 |
| 3100 | 2530 | 0 |
| 3110 | 2540 | 0 |
| 3120 | 2540 | 0 |
| 3040 | 2590 | 90 |
| 3010 | 2590 | 90 |
| 3020 | 2590 | 90 |
| 3030 | 2590 | 90 |
| 3040 | 2600 | 90 |
| 3030 | 2600 | 90 |
| 3040 | 2600 | 90 |

Fig. 7

| Crosswalk ID | x | y | longitude | latitude | direction |
|---|---|---|---|---|---|
| 1 | 3040 | 2500 | 139.7540392 | 35.74757938 | 90 |
| 1 | 3010 | 2510 | 139.7540447 | 35.74757938 | 90 |
| 1 | 3020 | 2510 | 139.7540558 | 35.74757939 | 90 |
| 1 | 3030 | 2510 | 139.7540613 | 35.74757939 | 90 |
| 1 | 3040 | 2510 | 139.7540668 | 35.7475794 | 90 |
| 2 | 2950 | 2530 | 139.7551228 | 35.74758009 | 0 |
| 2 | 2960 | 2530 | 139.7551283 | 35.74758009 | 0 |
| 2 | 2970 | 2530 | 139.7551338 | 35.7475801 | 0 |
| 2 | 2980 | 2530 | 139.7551394 | 35.7475801 | 0 |
| 2 | 2950 | 2540 | 139.7551449 | 35.7475801 | 0 |
| 2 | 2960 | 2540 | 139.7551504 | 35.74758011 | 0 |
| 3 | 2970 | 2530 | 139.7551559 | 35.74758011 | 0 |
| 3 | 2980 | 2530 | 139.7540392 | 35.74757487 | 0 |
| 3 | 3090 | 2530 | 139.7540447 | 35.74757488 | 0 |
| 3 | 3100 | 2530 | 139.7540558 | 35.74757488 | 0 |
| 3 | 3110 | 2540 | 139.7540613 | 35.74757489 | 0 |
| 3 | 3120 | 2540 | 139.7540668 | 35.74757489 | 0 |
| 4 | 3040 | 2590 | 139.7540724 | 35.74757489 | 90 |
| 4 | 3010 | 2590 | 139.7540779 | 35.7475749 | 90 |
| 4 | 3020 | 2590 | 139.7551283 | 35.74757558 | 90 |
| 4 | 3030 | 2590 | 139.7551338 | 35.74757559 | 90 |
| 4 | 3040 | 2600 | 139.7551394 | 35.74757559 | 90 |
| 4 | 3030 | 2600 | 139.7551449 | 35.7475756 | 90 |
| 4 | 3040 | 2600 | 139.7551504 | 35.7475756 | 90 |

CROSSWALK DETECTION DEVICE, METHOD AND PROGRAM

CROSS-REFERENCE TO RELATED APPLICATIONS

This application is a 371 U.S. National Phase of International Application No. PCT/JP2019/022017, filed on Jun. 3, 2019, which claims priority to Japanese Application No. 2018-107121 filed on Jun. 4, 2018. The entire disclosures of the above applications are incorporated herein by reference.

TECHNICAL FIELD

Embodiments of the present invention relate to a crosswalk detection device, method, and program.

BACKGROUND ART

In recent years, barrier-free urban areas or the like have been promoted in order to enable pedestrians, especially those with physical impairments such as the elderly and the disabled, to travel freely. In such barrier-free implementations, it is an urgent task to develop a barrier-free map for supporting travel planning of the elderly and the disabled.

However, at present, sufficient information has not been prepared for barrier-free information, and a method of collecting barrier-free information using crowdsourcing has been proposed (for example, see Non Patent Literature 1).

CITATION LIST

Non Patent Literature

Non Patent Literature 1: Takahiro Miura, Kenichiro Yabu, Masatsugu Sakajiri, Mari Ueda, Atsushi Hiyama, Michitaka Hirose, Toni Ifukube, Sharing Accessibility Information for People with Disabilities: Analyses of Information Acquired by Field Assessment and Crowdsourcing, Transactions of the Virtual Reality Society of Japan, Vol. 21 (2016) No. 2, pp. 283-294

SUMMARY OF THE INVENTION

Technical Problem

Information on a crosswalk is essential for a pedestrian to safely cross a roadway. However, at presents, comprehensive maintenance of information on crosswalks has not been performed in domestic companies that make maps.

The present invention has been made in view of the above circumstances, and an object of the present invention is to provide a crosswalk detection device, method, and program for enabling information on crosswalks to be appropriately detected.

Means for Solving the Problem

To achieve the object, a first aspect of a crosswalk detection device according to an embodiment of the present invention is a crosswalk detection device including a processor, wherein the processor is configured to perform image scanning processing for scanning aerial image data in unit of window having a preset size, perform multiple line segment creation processing for creating a plurality of line segments corresponding to a distance based on a dimension of a crosswalk in any direction within a region scanned in the window through the image scanning processing in the aerial image data, perform first calculation processing for calculating an absolute value of a first derivative value indicating a difference in brightness between both ends of the line segment for each of the plurality of line segments created through the multiple line segment creation processing and calculating an average value of the absolute value of the first derivative value for each angle of the line segment, perform second calculation processing for calculating an absolute value of a second derivative value indicating a difference between a difference in brightness between a first end of the line segment and an intermediate point of the line segment and a difference in brightness between the intermediate point and a second end of the line segment for each of the plurality of line segments created through the multiple line segment creation processing, and calculating an average value of the absolute value of the second derivative value for each angle of the line segment, and perform crosswalk determination processing for determining that coordinates of each of the plurality of line segments created through the multiple line segment creation processing are coordinates of the crosswalk based on calculation results of the first and second calculation processing.

A second aspect of the crosswalk detection device of the present invention is the crosswalk detection device according to the first aspect, wherein the processor is configured to, as the crosswalk determination processing, perform minimum value angle comparison processing for comparing an angle of a minimum value of the average value of the absolute value of the first derivative value calculated through the first calculation processing with an angle of a minimum value of the average value of the absolute value of the second derivative value calculated through the second calculation processing, perform angle difference determination processing for determining a difference between the angle of the minimum value of the average value of the absolute value of the second derivative value and an angle of a maximum value of the average value of the absolute value of the second derivative value calculated through the second calculation processing, and determine that, when the angle of the minimum value of the average value of the absolute value of the first derivative value and the angle of the minimum value of the average value of the absolute value of the second derivative value are the same as a result of the comparison in the minimum value angle comparison processing and the difference determined through the angle difference determination processing is 90 degrees, coordinates of the line segment created through the multiple line segment creation processing are coordinates of the crosswalk.

A third aspect of the crosswalk detection device of the present invention is the crosswalk detection device according to the second aspect, wherein the processor is configured to, as the crosswalk determination processing, perform minimal value maximal value comparison processing for comparing the angle of a minimal value of the average value of the absolute value of the first derivative value calculated through the first calculation processing with the angle of a maximal value of the average value of the absolute value of the second derivative value calculated through the second calculation processing, and determine that, when the angle of the minimum value of the average value of the absolute value of the first derivative value and the angle of the minimum value of the average value of the absolute value of the second derivative value are the same as a result of the comparison in the minimum value angle comparison processing, the difference determined through the angle difference determination processing is 90 degrees, and the angle of the minimal value of the average value of the absolute value of the first derivative value and the angle of the maximal value of the average value of the absolute value of the second derivative value are the same as a result of the comparison in the minimal value maximal value comparison processing, the coordinates of the line segment created through the multiple line segment creation processing are coordinates of the crosswalk.

A fourth aspect of the crosswalk detection device of the present invention is the crosswalk detection device according to the first aspect, wherein the processor is configured to, as the crosswalk determination processing, determine that, when the angle of the minimum value of the average value of the absolute value of the first derivative value calculated through the first calculation processing and the angle of the minimum value of the average value of the absolute value of the second derivative value calculated through the second calculation processing are the same, the angle is an angle corresponding to a direction of a striped pattern of the crosswalk.

A fifth aspect of the crosswalk detection device of the present invention is the crosswalk detection device according to any one of the first to fourth aspects, wherein the processor is configured to, as the image scanning processing, set only a region of a roadway in the aerial image data as a scanning target.

A sixth aspect of the crosswalk detection device of the present invention is the crosswalk detection device according to any one of the first to fifth aspects, wherein the processor is configured to perform clustering processing for scanning, after a determination of a plurality of coordinates of the crosswalk in the crosswalk determination processing, the plurality of coordinates of the crosswalk in unit of the window, and regarding, when the plurality of coordinates of the crosswalk corresponding to line segments of a striped pattern forming the same angle enter the region scanned in the window, a crosswalk represented by the plurality of coordinates as one crosswalk.

A seventh aspect of the crosswalk detection device of the present invention is the crosswalk detection device according to the sixth aspect, wherein the processor is configured to, as the clustering processing, expand a size of the window in a direction at an angle of a line segment of the striped pattern corresponding to the coordinates of the crosswalk entering the region scanned in the window, and regard, when a plurality of coordinates of the crosswalk corresponding to the line segments of the striped pattern forming the same angle enter the region scanned in the window that is expanded, a crosswalk represented by the plurality of coordinates as one crosswalk.

One aspect of a crosswalk detection method according to an embodiment of the present invention is a crosswalk detection method performed by a crosswalk detection device including a processor, wherein the processor performs processing of scanning aerial image data in unit of window having a preset size, the processor performs processing of creating a plurality of line segments corresponding to a distance based on a dimension of a crosswalk in any direction within a region scanned in the window in the aerial image data, the processor performs processing of calculating an absolute value of a first derivative value indicating a difference in brightness between both ends of the line segment for each of the plurality of created line segments and calculating an average value of the absolute value of the first derivative value for each angle of the line segment, the processor performs processing of calculating an absolute value of a second derivative value indicating a difference between a difference in brightness between a first end of the line segment and an intermediate point of the line segment and a difference in brightness between the intermediate point and a second end of the line segment for each of the plurality of created line segments, and calculating an average value of the absolute value of the second derivative value for each angle of the line segment, and the processor performs processing of determining that coordinates of each of the plurality of created line segments are coordinates of the crosswalk based on calculation results of the average value of the absolute value of the first derivative value and calculation results of the average value of the absolute value of the second derivative value.

One aspect of a crosswalk detection processing program according to an embodiment of the present invention is a crosswalk detection processing program for causing the processor to operate as each processing of the crosswalk detection device according to any one of the first to seventh aspects.

Effects of the Invention

With the first aspect of the crosswalk detection device according to the embodiment of the present invention, the angle-specific average value of the absolute values of the first derivative value and the second derivative value based on the brightness of each point of the line segment specific to the crosswalk obtained from the aerial image data is calculated, and a position at which there is the crosswalk is detected on the basis of results of the calculation. This allows crosswalk information to be appropriately detected.

With the second aspect of the crosswalk detection device according to the embodiment of the present invention, the coordinates of the crosswalk are determined on the basis of the angle difference between the minimum values of the average values specific to the angle of the first derivative absolute value and the second derivative absolute value and the angle difference between the minimum value and the maximum value of the average value specific to the angle of the second derivative absolute value, which are based on the brightness of both the ends and the intermediate point of the line segment specific to the crosswalk. This allows the coordinates of the crosswalk to be accurately determined.

With the third aspect of the crosswalk detection device according to the embodiment of the present invention, the coordinates of the crosswalk are determined on the basis of the angle difference between the minimum values of the average values specific to the angle of the first derivative absolute value and the second derivative absolute value, the angle difference between the minimum value and the maximum value of the average value specific to the angle of the second derivative absolute value, and the difference between the angle of the minimal value of the average value specific to the angle of the first derivative absolute value and the angle of the maximal value of the average value specific to the angle of the second derivative absolute value, which are based on the brightness of both the ends and the intermediate points of the line segment specific to the crosswalk. This allows coordinates of a crosswalk to be determined with higher accuracy.

With the fourth aspect of the crosswalk detection device according to the embodiment of the present invention, the direction of the striped pattern of the crosswalk is determined on the basis of the angle difference between the minimum values of the average values specific to the angle of the first derivative absolute value and the second derivative absolute value, which are based on the brightness of both the ends and the intermediate points of the line segment specific to the crosswalk. This allows the direction of the striped pattern of the crosswalk to be determined with high accuracy.

With the fifth aspect of the crosswalk detection device according to the embodiment of the present invention, only the region corresponding to the roadway in the aerial image data is set as the scanning target. This allows a processing time to be shortened and a crosswalk in a region that is not a roadway to be prevented from being erroneously detected.

With the sixth and seventh aspects of the crosswalk detection device according to the embodiment of the present invention, since the clustering processing for regarding the crosswalk represented by the plurality of coordinates of the crosswalk corresponding to the line segments of the striped pattern forming the same angle as one crosswalk when the coordinates enter the region scanned in the window is performed, one crosswalk can be accurately clustered for a case in which a crosswalk with different types of scale and configuration is a target and a case in which an aerial photograph in which there is an obstacle on the crosswalk is used.

That is, according to the present invention, it is possible to appropriately detect information on crosswalks.

BRIEF DESCRIPTION OF DRAWINGS

FIG. 7 is a diagram illustrating an example of a list of crosswalk detection positions.

FIG. 10 is a diagram illustrating an example of final output data of the crosswalk detection position.

DESCRIPTION OF EMBODIMENTS

Hereinafter, one embodiment of the present invention will be described below with reference to the drawings.

Figure 1:
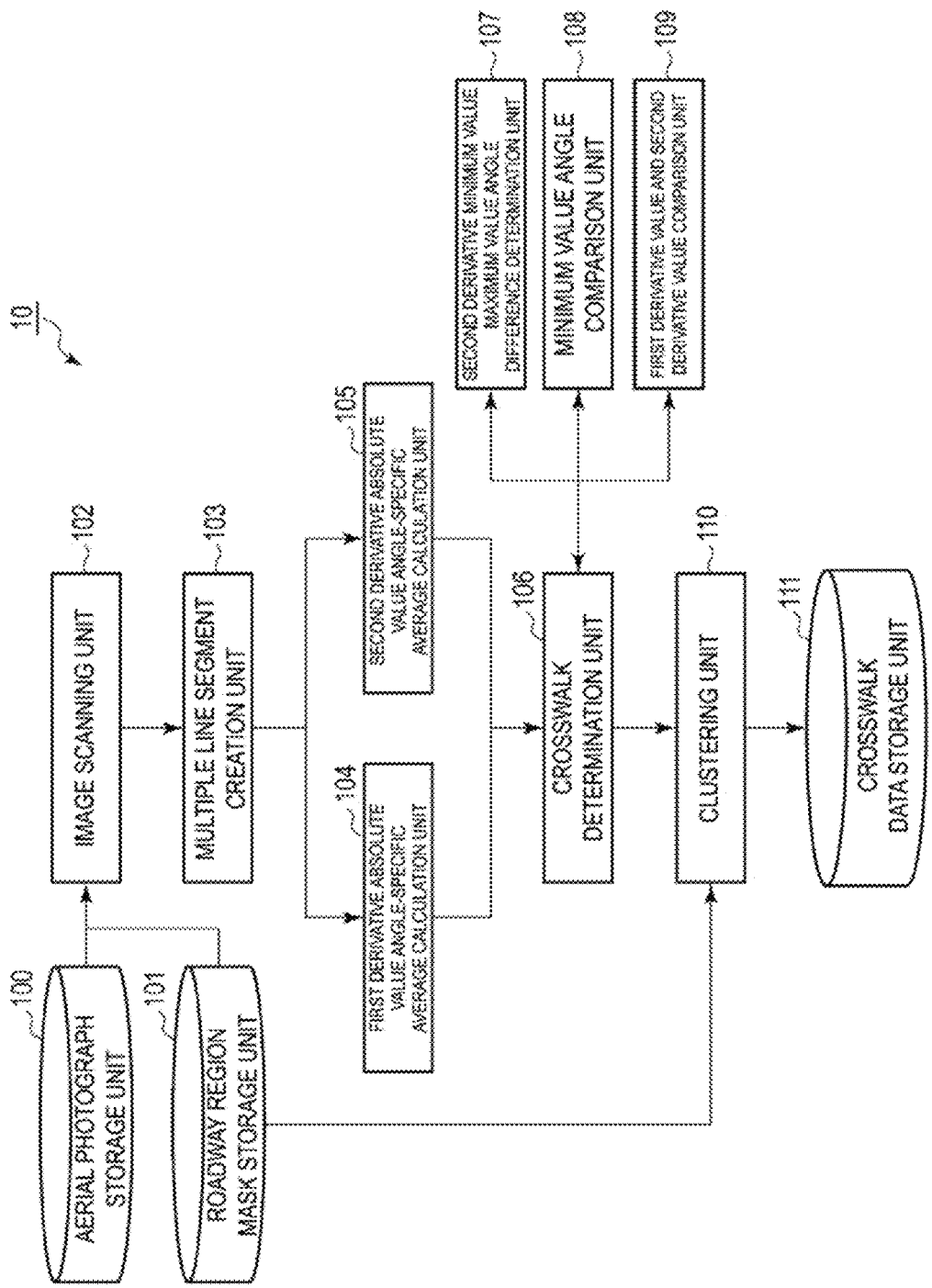
FIG. 1 is a diagram illustrating an example of an application of a crosswalk detection device according to an embodiment of the present invention.

FIG. 1 is a diagram illustrating an application example of a crosswalk detection device according to an embodiment of the present invention.

As illustrated in FIG. 1, a crosswalk detection device 10 includes an aerial photograph storage unit 100, a roadway region mask storage unit 101, an image scanning unit 102, a multiple line segment creation unit 103, a first derivative absolute value angle-specific average calculation unit (a first calculation processing unit) 104, a second derivative absolute value angle-specific average calculation unit (a second calculation processing unit) 105, a crosswalk determination unit 106, a second derivative minimum value maximum value angle difference determination unit 107, a minimum value angle comparison unit 108, a first derivative value and second derivative value comparison unit (a minimal value maximal value comparison processing unit) 109, a clustering unit 110, and a crosswalk data storage unit 111. The crosswalk determination unit 106 may include the second derivative minimum value maximum value angle difference determination unit 107, the minimum value angle comparison unit 108, and the first derivative value and second derivative value comparison unit 109. Details of each unit will be described below.

Further, the crosswalk detection device 10 can be implemented by a system in which a computer device such as a personal computer (PC) is used. For example, the computer device includes a processor, such as a central processing unit (CPU), a memory connected to the processor, and an input/output interface. Among these, the memory is configured using a storage device having a storage medium such as a non-volatile memory.

Functions of the image scanning unit 102, the multiple line segment creation unit 103, the first derivative absolute value angle-specific average calculation unit 104, the second derivative absolute value angle-specific average calculation unit 105, the crosswalk determination unit 106, the second derivative minimum value maximum value angle difference determination unit 107, the minimum value angle comparison unit 108, the first derivative value and second derivative value comparison unit 109, and the clustering unit 110 are implemented, for example, by the processor reading and executing a program stored in the memory. Some or all of these functions may be implemented by a circuit such as an application specific integrated circuit (ASIC).

The aerial photograph storage unit 100, the roadway region mask storage unit 101, and the crosswalk data storage unit 111 are provided in a non-volatile memory on which writing and reading can be performed at any time among the memories.

Figure 2:
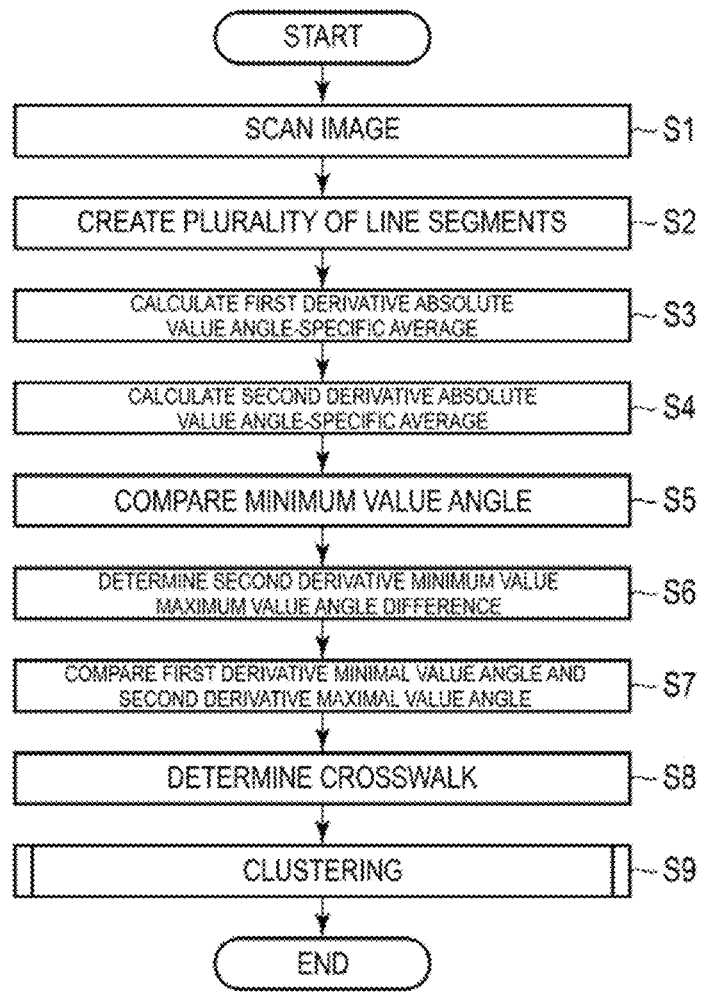
FIG. 2 is a diagram illustrating an example of a processing procedure of the crosswalk detection device according to the embodiment of the present invention.
Figure 3:
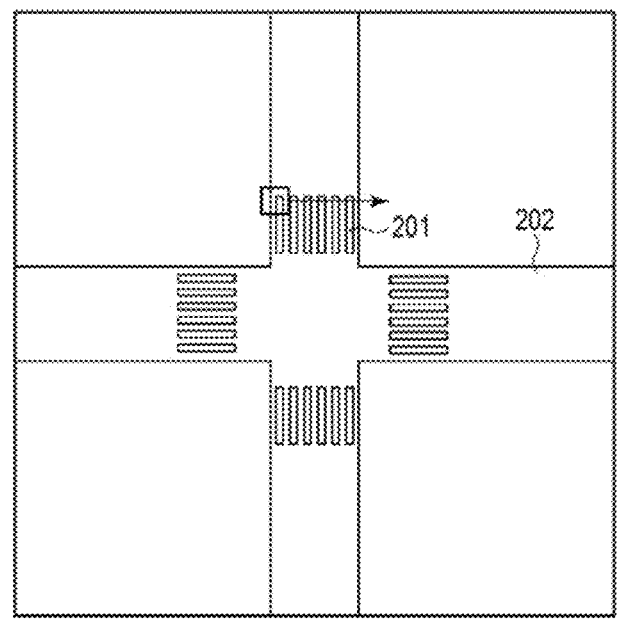
FIG. 3 is a diagram illustrating an example of aerial photograph data.

Next, processing of the crosswalk detection device 10 will be described. FIG. 2 is a diagram illustrating an example of a processing procedure of the crosswalk detection device according to an embodiment of the present invention. FIG. 3 is a diagram illustrating an example of the aerial photograph data. Digital aerial photograph data, which is aerial image data, for example, as illustrated in FIG. 3 is stored in the aerial photograph storage unit 100. The digital aerial photograph data may be referred to simply as an aerial photograph. As the aerial photograph data, ground image data captured by a satellite or a drone may also be used, in addition to ground image data captured by an aircraft.

Image Scanning

The image scanning unit 102 reads out the digital aerial photograph stored in the aerial photograph storage unit 100, and scans the digital aerial photograph from the upper left to the lower right of the photo in unit of particular window. Thereby, the image scanning unit 102 detects an image pattern 201 having a position and a direction of the crosswalk specific to the crosswalk (S1).

A latitude and longitude of a pixel at reference coordinates (0, 0) of the digital aerial photograph and a photograph resolution are assumed to be found in advance. This allows a latitude and longitude of a scanning position on the digital aerial photograph to be obtained when a crosswalk is detected at the scanning position in the digital aerial photograph.

For a digital aerial photograph, a so-called ortho image (Digital Japan Basic Map) in which a roadway such as 202 illustrated in FIG. 3 is less hidden by buildings may be used instead of a normal aerial photograph. This allows the image scanning unit 102 to detect positions of more crosswalks.

Figure 4:
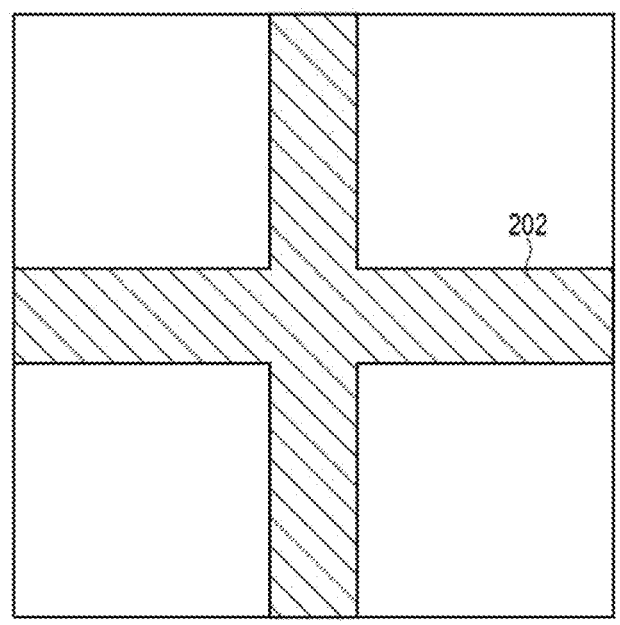
FIG. 4 is a diagram illustrating an example of roadway polygon data.

FIG. 4 is a diagram illustrating an example of roadway polygon data.

Further, for a region of the roadway relevant to the crosswalk, a region in which there is a roadway 202 is traced from the aerial photograph based on the aerial photograph, and a result thereof is often digitized as the roadway polygon data as illustrated in FIG. 4. The roadway polygon data may be stored in the roadway region mask storage unit 101.

When the image scanning unit 102 scans the digital aerial photograph, the image scanning unit 102 may scan only a region indicating the roadway in the digital aerial photograph based on the roadway polygon data stored in the roadway region mask storage unit 101. Specifically, the image scanning unit 102 draws a background as "0" and the roadway polygon data as "1" using a bitmap mask having the same pixel size as a pixel size of the aerial photograph, and sets only a region corresponding to coordinates that are "1" in the aerial photograph as a scanning target. This allows a processing time to be shortened and a crosswalk in a region that is not a roadway to be prevented from being erroneously detected.

Multiple Line Segment Creation

Next, creation of a plurality of line segments for detecting an image pattern specific to a crosswalk will be described. The crosswalk is a crosswalk in which a white striped pattern having a length of 45 centimeters in a lateral direction has been drawn. Thus, the multiple line segment creation unit 103 scans the aerial photograph in units of windows having a specific size, and acquires (creates) line segments connecting three points aligned in a line at 45-centimeter intervals in a region scanned in the window, a plurality of times, in a random direction (angle) (S2).

Figure 5:
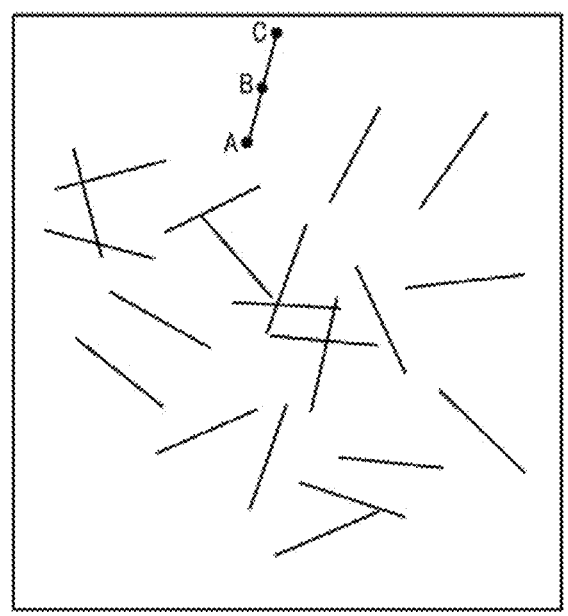
FIG. 5 is a diagram illustrating an example of a result of creation of a plurality of line segments.

FIG. 5 is a diagram illustrating an example of a result of creation of a plurality of line segments. For example, when the aerial photograph to be used has a resolution of 10 centimeters, that is, one pixel corresponds to an actual distance of 10 centimeters, the multiple line segment creation unit 103 scans a window formed of 40 pixels in vertical and horizontal directions corresponding to four meters in the vertical and horizontal directions, and sets points such as points A, B, and C) illustrated in FIG. 5 so that a distance from a first end to a second end of the three points is nine pixels. The point B is a point located halfway between the point A (the first end) and the point C (the second end).

Here, in practice, an image of the aerial photograph may be blurred. Thus, the multiple line segment creation unit 103 may adjust a pixel interval between the three points so that detection performance is the highest according to a state of this blur.

Calculation of Average Specific to Angle of First Derivative Absolute Value

Then, the first derivative absolute value angle-specific average calculation unit 104 obtains a first derivative absolute value Difference1 for each line segment according to Equation (1) below, with brightness of the points A, B, and C set as Av, By, and Cv.

$$\text{Difference1} = |Cv - Av| \qquad \text{Equation (1)}$$

The first derivative absolute value angle-specific average calculation unit 104 calculates an average value Difference1$_{av}$ of the first derivative absolute value Difference1 obtained for each line segment at the same angle (S3). Thus, the average value Difference1$_{av}$ of the first derivative absolute value is calculated for each angle (direction) of the line segment. Here, the average value of the first derivative absolute value for each angle includes a first derivative absolute value when there is only one line segment at a certain angle.

Calculation of Average Specific to Angle of Second Derivative Absolute Value

Then, the second derivative absolute value angle-specific average calculation unit 105 obtains the second derivative absolute value Difference2 for each line segment according to Equation (2) below. A right side of Equation (2) is based on |Av−Bv−(Bv−Cv)|, which is an absolute value of a difference between a difference in brightness between a first end of the line segment and an intermediate point of the line segment and a difference in brightness between the intermediate point of the line segment and a second end thereof.

$$\text{Difference2} = |Av + Cv - 2*Bv| \qquad \text{Equation (2)}$$

Then, the second derivative absolute value angle-specific average calculation unit 105 calculates an average value Difference2$_{av}$ of the second derivative absolute value Difference2 obtained for each of the line segments at the same angle (S4). Thereby, the average value Difference2$_{av}$ of the second derivative absolute value is calculated for each angle (direction) of the line segment. Here, the average value of the second derivative absolute value for each angle includes a second derivative absolute value when there is only one line segment at a certain angle.

A range of the angles of the line segment is set from 0 degrees to 180 degrees, and the first derivative absolute value angle-specific average calculation unit 104 and the second derivative absolute value angle-specific average calculation unit 105 may round off the angle of the line segment, total them in steps of 10 degrees, for example, and obtain various average values specific to each angle based on such totaling.

Crosswalk Determination

The crosswalk determination unit 106 instructs the minimum value angle comparison unit 108, the second derivative minimum value maximum value angle difference determination unit 107, and the first derivative value and second derivative value comparison unit 109 to perform processing.

The minimum value angle comparison unit 108 compares an angle according to the minimum value of the average value Difference1$_{av}$ of the first derivative absolute value obtained for each angle with an angle according to the minimum value of the average value Difference2$_{av}$ of the second derivative absolute value obtained for each angle according to an instruction from the crosswalk determination unit 106. The minimum value angle comparison unit 108 determines whether these compared angles are the same, and returns a result of the determination to the crosswalk determination unit 106 (S5).

Further, the second derivative minimum value maximum value angle difference determination unit 107 determines whether a difference between an angle according to a minimum value of the average value Difference1$_{av}$ of the second derivative absolute value Difference2 obtained for each angle and an angle according to a maximum value of the average value Difference2$_{av}$ of the second derivative absolute value Difference2 obtained for each angle is 90 degrees according to an instruction from the crosswalk determination unit 106. The second derivative minimum value maximum value angle difference determination unit 107 returns a result of the determination to the crosswalk determination unit 106 (S6).

Further, the first derivative value and second derivative value comparison unit 109 determines whether an angle according to the minimal value of the average value Difference1$_{av}$ of the first derivative absolute value Difference1 obtained for each angle and an angle according to the maximal value of the average value Difference2$_{av}$ of the second derivative absolute value Difference2 obtained for each angle are the same according to the instruction from the crosswalk determination unit 106. The first derivative value and second derivative value comparison unit 109 returns a result of the determination to the crosswalk determination unit 106 (S7).

Figure 6:
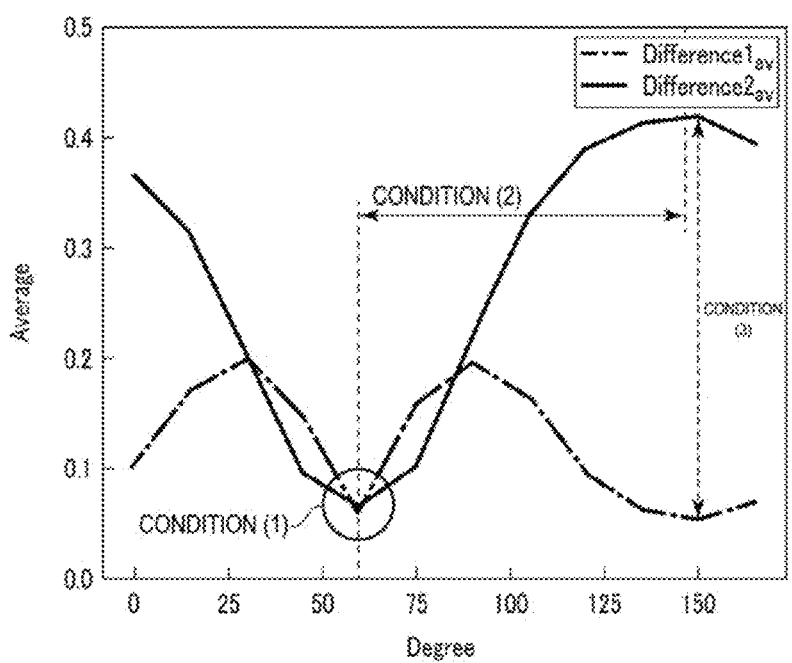
FIG. 6 is a diagram illustrating an overall determination in a crosswalk determination unit.

When the crosswalk determination unit 106 receives determination results from the minimum value angle comparison unit 108, the second derivative minimum value maximum value angle difference determination unit 107, and the first derivative value and second derivative value comparison unit 109, the crosswalk determination unit 106 performs an overall determination based on these determination results. When conditions for the overall determination such as Conditions (1) and (2) below are all satisfied or all of Conditions (1), (2), and (3) below are satisfied, the crosswalk determination unit 106 determines that a position of the line segment satisfying this condition is a position at which there is the crosswalk (S8). FIG. 6 is a diagram illustrating the overall determination in the crosswalk determination unit.

Condition (1) The angle of the minimum value of Difference1$_{av}$ specific to an angle and the angle of the minimum value of Difference2$_{av}$ specific to an angle are the same (based on the determination result of the minimum value angle comparison unit 108).

Condition (2) The difference between the angle of the minimum value of Difference2$_{av}$ specific to an angle and the angle of the maximum value of Difference2$_{av}$ specific to an angle is 90 degrees (based on the determination result from the second derivative minimum value maximum value angle difference determination unit 107).

Condition (3) The angle of the minimal value of Difference1$_{av}$ specific to an angle and the angle of the maximal value of Difference2$_{av}$ specific to an angle are the same (based on the determination result from the first derivative value and second derivative value comparison unit 109).

The same angle in Condition (1) may be a difference between angles in a certain range, such as a difference in angle within 10 degrees.

The angle of 90 degrees in Condition (2) may be an angle in a certain range, such as an angle in a range from 80 degrees to 100 degrees.

As for the minimal value in Condition (3), a value at a certain ranking or higher of Difference1$_{av}$ specific to an angle sorted in an ascending order may be set as the minimal value, and the same applies to the maximal value. That is, the maximal value in Condition (3) may be set a value at a certain ranking or higher of the average values Difference2$_{av}$ specific to an angle sorted in a descending order.

Further, the crosswalk determination unit 106 extracts the angle of the minimum value determined by the minimum value angle comparison unit 108 in Condition (1) above together with the position of the crosswalk, as an angle according to the direction of the striped pattern of the crosswalk.

The crosswalk determination unit 106 generates a list of crosswalk detection positions consisting of coordinates (x, y) and an angle (direction) using the above results. FIG. 7 is a diagram illustrating an example of a list of the crosswalk detection positions.

Clustering of Crosswalk Detection Pattern (Labeling) In the above processing, a pattern of crosswalk is detected for one crosswalk a plurality of times. Thus, the clustering unit 110 performs processing of clustering (labeling) the position of the crosswalk detected for each crosswalk (S9).

Figure 8:
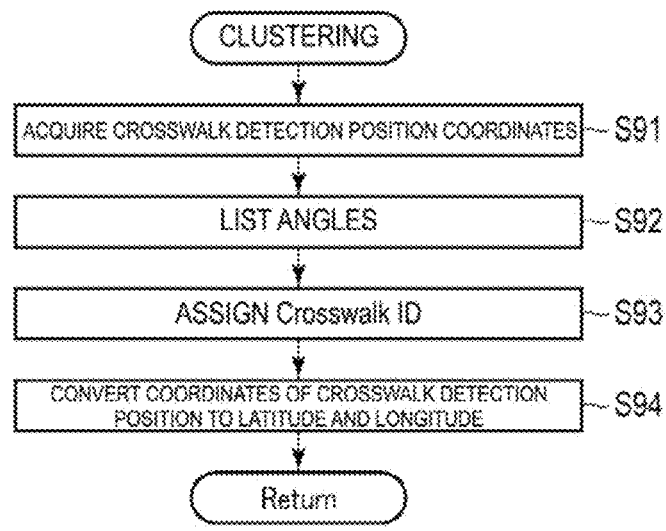
FIG. 8 is a diagram illustrating an example of a procedure of clustering processing in a crosswalk detection device according to an embodiment of the present invention.

Specific examples of the clustering processing will be described in S91 to S94 below. FIG. 8 is a diagram illustrating an example of a procedure of clustering processing in the crosswalk detection device according to the embodiment of the present invention.

Figure 9:
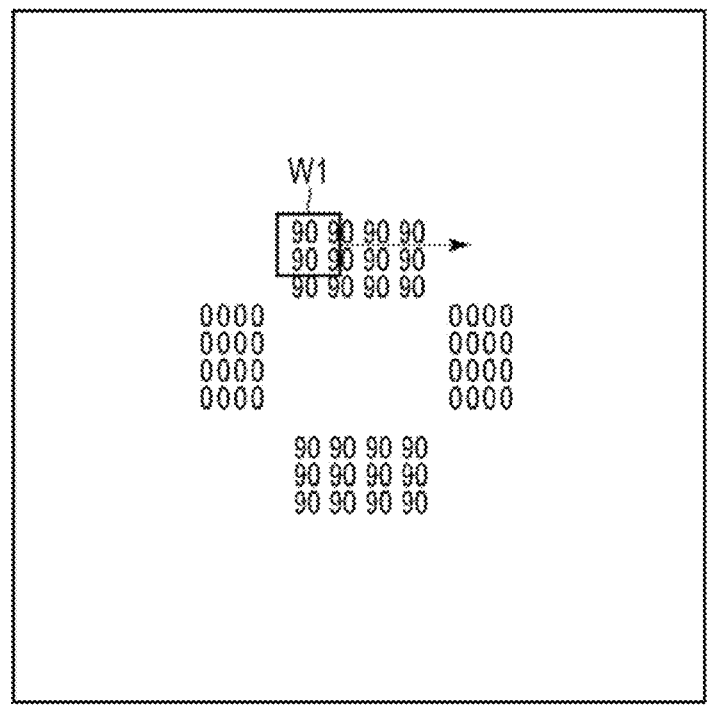
FIG. 9 is a diagram illustrating acquisition of coordinates of a crosswalk detection position.

FIG. 9 is a diagram illustrating acquisition of coordinates of the crosswalk detection position. As illustrated in FIG. 9, the clustering unit 110 scans the aerial photograph in units of window W1 having a specific size and acquires all of the coordinates (see FIG. 7) of the crosswalk detection positions included in the region scanned in the window (sometimes referred to simply as within the window) by referring to the list of the crosswalk detection positions generated by the crosswalk determination unit 106 (S91). It is assumed that a size of the window W1 is a size greater than a size of the window at the time of the crosswalk detection, such as 120 pixels in vertical and horizontal directions, so that a plurality of crosswalk detection positions are included.

The clustering unit 110 may create a bitmap mask using the roadway polygon data stored in the roadway region mask storage unit 101 and limit a scanning range, as in the crosswalk position detection.

The clustering unit 110 lists all angles assigned to the crosswalk detection positions included in the window W1 except for overlapping angles from the list of the crosswalk detection positions by referring to the list of the crosswalk detection positions (S92).

The clustering unit 110 extracts the listed angles one by one, extracts the respective crosswalk detection positions (see FIG. 7) in the region scanned in the window at the same angle as such an angle, and generates output data in which the same Crosswalk ID has been assigned to these crosswalk detection positions (S93).

In this case, when the crosswalk detection position to which the Crosswalk ID has already been assigned is present in the output data, the clustering unit 110 may assign the Crosswalk ID to another crosswalk detection position to which no Crosswalk ID has yet been assigned.

The clustering unit 110 regards the crosswalk detection positions to which the same Crosswalk ID has been assigned, as those indicating one crosswalk.

Finally, the clustering unit 110 converts x, y coordinates of the crosswalk detection position to a latitude and longitude based on the latitude and longitude of the reference coordinates of the aerial photograph and information on the resolution of the aerial photograph (S94).

The clustering unit 110 stores final output data after the conversion to the latitude and longitude in the crosswalk data storage unit 111. FIG. 10 is a diagram illustrating an example of the final output data of the crosswalk detection position.

Figure 11A:
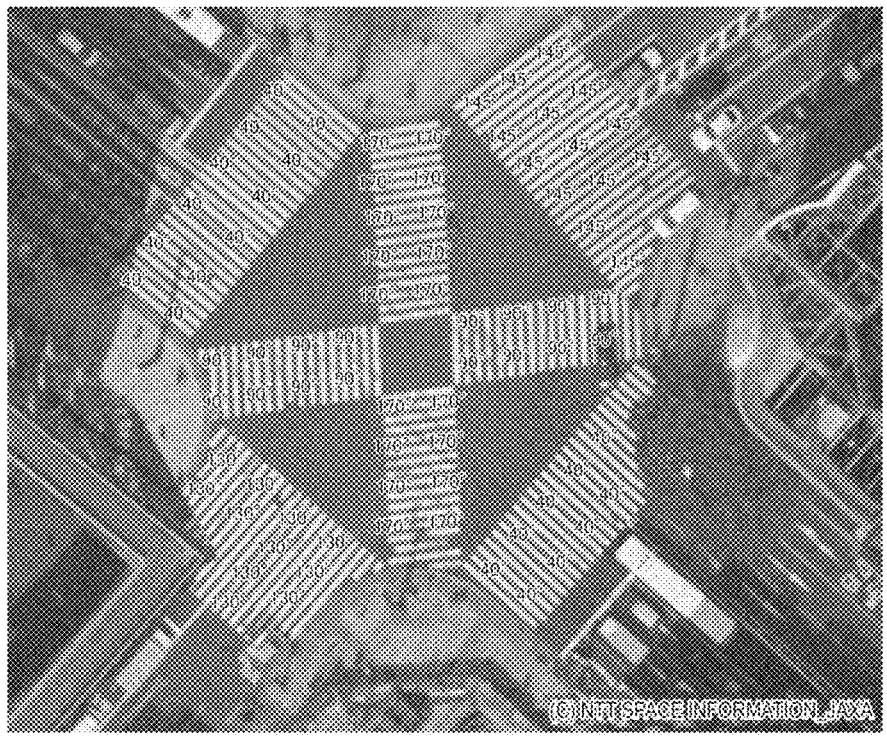
FIG. 11A is a diagram illustrating an example of an aerial photograph and crosswalk detection positions of a crosswalk $C_1$.
Figure 11B:
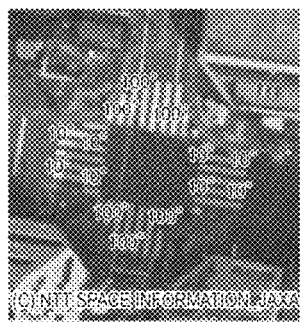
FIG. 11B is a diagram illustrating an example of an aerial photograph and crosswalk detection positions of a crosswalk $C_2$.
Figure 11C:
FIG. 11C is a diagram illustrating an example of an aerial photograph and crosswalk detection positions of a crosswalk $C_3$.

Here, the clustering processing as described so far is an example of a simple implementation, and defects may occur when various parameters are fixed and applied to various aerial photographs. FIGS. 11A, 11B, and 11C illustrate aerial photographs of three different crosswalks and crosswalk detection positions therefor. Specifically, FIG. 11A is a diagram illustrating an aerial photograph of a crosswalk $C_1$ and crosswalk detection positions therefor. FIG. 11B is a diagram illustrating the aerial photograph of a crosswalk $C_2$ and crosswalk detection positions therefor. FIG. 11C is a diagram illustrating an aerial photograph of a crosswalk $C_3$ and crosswalk detection positions therefor.

Angles of line segments forming a striped pattern of the crosswalk, which correspond to detection positions, are described at the individual the crosswalk detection positions illustrated in FIGS. 11A, 11B, and 11C. For example, as illustrated in FIG. 11A, when the angle of the line segment forming the striped pattern of the crosswalk corresponding to a certain crosswalk detection position is 170°, this crosswalk detection position is a crosswalk detection position having information on an angle of 170°. The total of three aerial photographs illustrated in FIGS. 11A, 11B, and 11C are shown on the same scale.

The crosswalk $C_1$ illustrated in FIG. 11A is a crosswalk at a scrambling intersection, there is a crossing intersection at a center, and there is no striped pattern of the crosswalk at the intersection, but it is preferable for the crosswalk detection positions detected at the same angle across a portion with no striped pattern to be able to be clustered as one cluster.

The crosswalk $C_2$ illustrated in FIG. 11B is a crosswalk that is at an intersection of a roadway having a narrow width, and a plurality of crosswalks are very close to each other, but it is preferable for these crosswalks to be clustered as four independent crosswalks.

The crosswalk $C_3$ illustrated in FIG. 11C is one crosswalk, and a plurality of vehicles just travel on the crosswalk such that crosswalk detection positions are separated, but it is preferable for these crosswalk detection positions to be able to be clustered as one cluster.

Figure 12A:
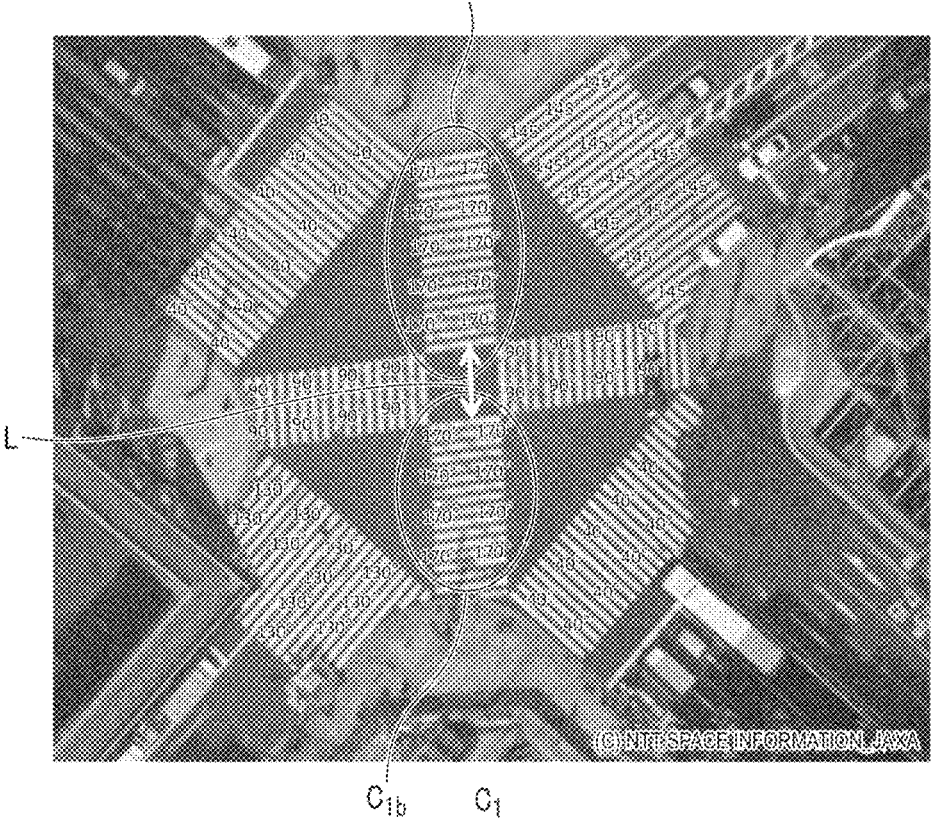
FIG. 12A is a diagram illustrating an example of an aerial photograph and crosswalk detection positions of the crosswalk $C_1$.
Figure 12B:
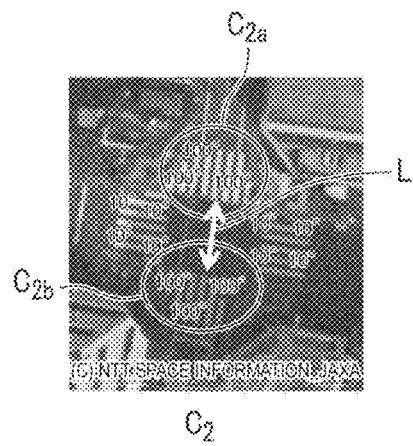
FIG. 12B is a diagram illustrating an example of an aerial photograph and crosswalk detection positions of the crosswalk $C_2$.
Figure 12C:
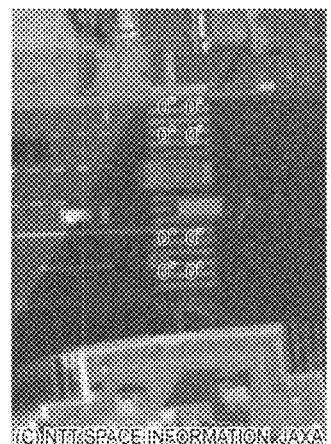
FIG. 12C is a diagram illustrating an example of an aerial photograph and crosswalk detection positions of the crosswalk $C_3$.

FIG. 12A is a supplemental view of FIG. 11A, FIG. 12B is a supplemental view of FIG. 11B, and FIG. 12C is a supplemental view of FIG. 11C.

In a crosswalk $C_1$ illustrated in FIG. 12A, crosswalk detection positions present in respective circles indicated by a first area $C_{1a}$ and a second area $C_{1b}$, separated by a center in the crosswalk $C_1$ are preferably clustered as one cluster as described above, but a distance L between the crosswalk detection position present in the circle indicating the first area $C_{1a}$ and the crosswalk detection position present in the circle indicating the second area $C_{1b}$ is about 6 m.

In this case, when a width in vertical and horizontal directions of the window W1 to be used for clustering as described above is 120 pixels, that is, 12 m, the crosswalk detection positions present in the circles corresponding to the first area $C_{1a}$ and the second area $C_{1b}$ illustrated in FIG. 12A are clustered as one cluster without problems.

On the other hand, in a crosswalk $C_2$ illustrated in FIG. 12B, it is preferable for a crosswalk detection position present in a circle indicated by a first area $C_{2a}$ and a crosswalk detection position present in a circle indicated by a second area $C_{2b}$, which are separated at a center, be clustered as separate clusters.

However, a distance L between the crosswalk detection position present in the circle indicating the first area $C_{2a}$ and the crosswalk detection position present in the circle indicating the second area $C_{2b}$ is also about 6 m, which is the same as that illustrated in FIG. 12A.

Thus, when the window W1 having a width in vertical and horizontal directions of 120 pixels is used, the crosswalk detection position present in the circle indicated by the first area $C_{2a}$ and the crosswalk detection position present in the circle indicated by the second area $C_{2b}$ are grouped as one cluster.

This is of course the same result when the size of the window W1 is equal to or greater than the above size, the crosswalk detection position present in the circle indicated by the first area $C_{2a}$ and the crosswalk detection position present in the circle indicated by the second area $C_{2b}$ in the crosswalk $C_2$ illustrated in FIG. 12B can be clustered as separate crosswalks when the distance L between the crosswalk detection positions is shorter than 6 m, but the crosswalk detection position present in the circle indicated by the first area $C_{1a}$ and the crosswalk detection position present in the circle indicated by the second area $C_{1b}$ in the crosswalk $C_1$ illustrated in FIG. 12A are also clustered as separate clusters.

Thus, a more sophisticated clustering processing may be performed as described below.

Figure 13:
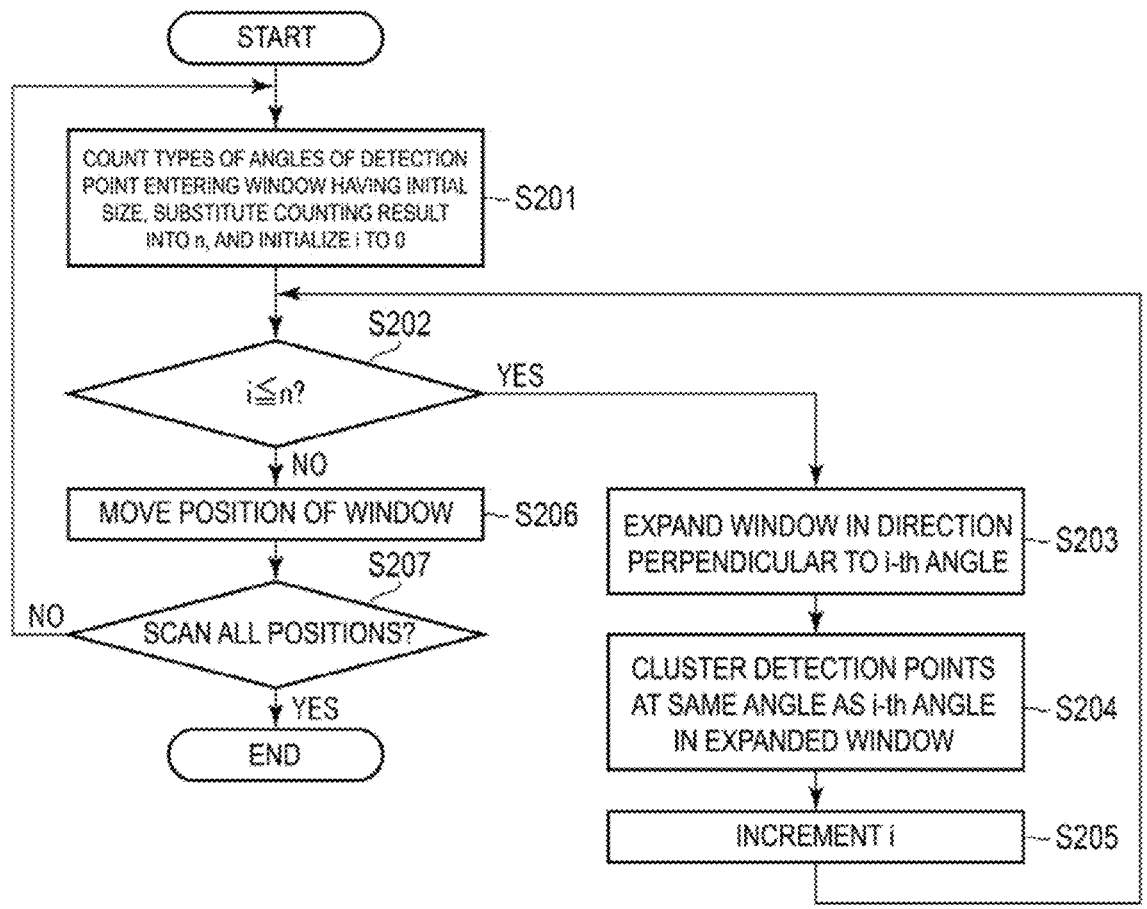
FIG. 13 is a flowchart illustrating an example of a processing operation for clustering crosswalk detection positions in the crosswalk detection device according to an embodiment of the present invention.

FIG. 13 is a flowchart illustrating an example of a processing operation for clustering the crosswalk detection position in the crosswalk detection device according to an embodiment of the present invention. FIG. 13 illustrates an example of a scheme for successfully clustering various crosswalk detection positions as illustrated in FIGS. 11A, 11B, and 11C.

Figure 14:
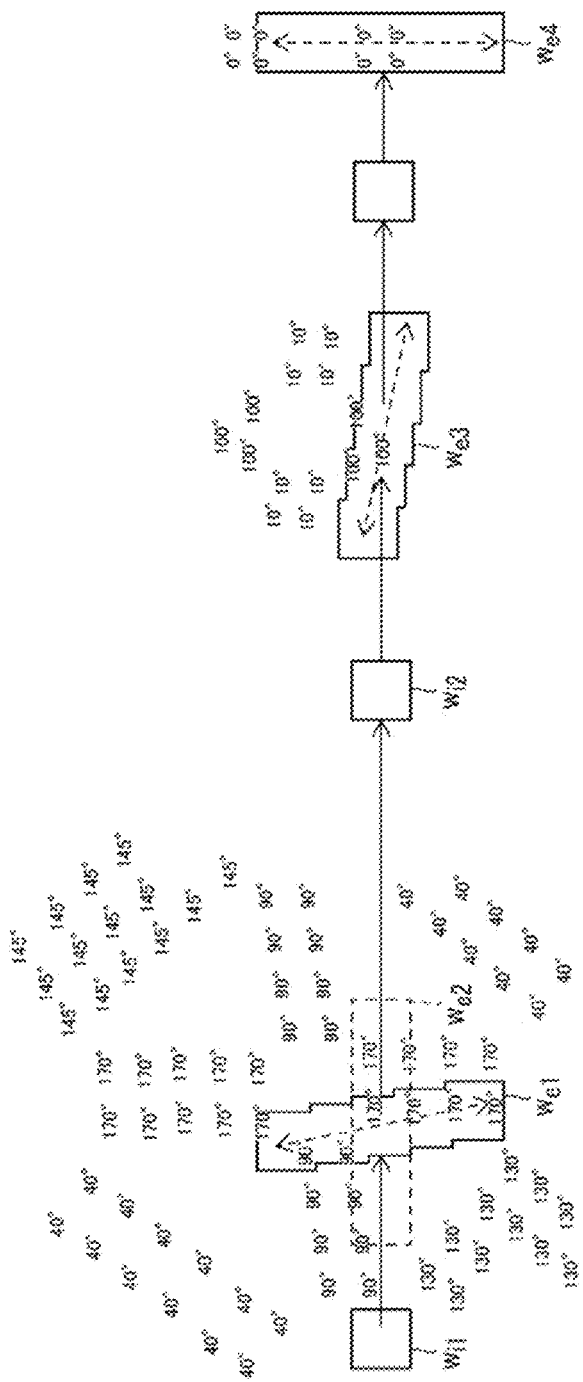
FIG. 14 is a diagram illustrating an example of a clustering result of crosswalk detection positions in the crosswalk detection device according to an embodiment of the present invention.

FIG. 14 is a diagram illustrating an example of a clustering result of a crosswalk detection position in the crosswalk detection device according to an embodiment of the present invention. FIG. 14 illustrates how the crosswalk detection positions in FIGS. 11A, 11B, and 11C are clustered using the scheme illustrated in FIG. 13.

As illustrated in FIG. 13, the clustering unit 110 starts scanning of the aerial photograph in a window having a predetermined initial size after the clustering starts (S201).

A width in vertical and horizontal directions of a window having an initial is assumed to be, for example, 5 m (50 pixels) smaller than 6 m.

In this scanning, when the crosswalk detection position has entered the region scanned in the window having the initial size, the clustering unit 110 counts types of angles of line segments forming the striped pattern of the crosswalk, which correspond to this position, and substitutes a counting result into a variable n. For example, when two types of crosswalk detection positions including a crosswalk detection position having 170° angle information and a crosswalk detection position having 90° angle information as illustrated in FIG. 12A enter the region scanned in the window having the initial size, the clustering unit 110 counts 2 that is the number of types, and substitutes 2 that is the number of types into the variable n. The clustering unit 110 initializes the variable i to 0.

Then, when the variable i is equal to or smaller than the variable n (YES in S202), the clustering unit 110 extracts an i-th angle of the crosswalk detection position, calculates an angle in a direction perpendicular to a direction at the angle, and performs processing of expanding the size of the window having the initial size according to the angle in this perpendicular direction (S203). The size of the expanded window is preferably at least 6 m or more, such as 8 m. The simplest method for expanding the size of the windows includes preparing coordinates of a window when the window has expanded in each direction in advance and switching between these coordinates.

For example, when the i-th angle is 170°, the angles in the vertical direction are 80° and −100°, and thus, the clustering unit 110 expands the size of the window in this direction.

The crosswalk detection positions at the same angle as the i-th angle, which have entered the region scanned in the expanded window, are clustered into the same cluster (S204). Here, the crosswalk detection position having an angle of 170° is clustered. Specifically, the clustering unit 110 generates output data in which the same Crosswalk ID has been assigned to the crosswalk detection position at 170°, which has entered the region scanned in the expanded window.

Then, the clustering unit 110 increments i (S205), returns to S202, extracts the i-th angle again when i is smaller than the variable n (YES in S202), and performs the processing of S203, S204, and S205 again.

In this example, an angle of 90° is extracted as the next angle, the size of the window is expanded in a direction of 0° and 180°, which is perpendicular to the direction at the angle, and the crosswalk detection position having an angle of 90° is clustered. Specifically, the clustering unit 110 generates output data in which the same Crosswalk ID has been assigned to the crosswalk detection position at 90°, which has entered the region scanned in the expanded window.

Thus, when the variable i exceeds the variable n (No in S202), the clustering unit 110 moves a position of the window by a predetermined distance (S206). After the windows have moved, the clustering unit 110 performs the same processing in the window having the initial size again, scans all the positions (YES in S207), and then, completes the processing.

As illustrated in FIG. 14, when the processing is performed as described above, the clustering unit 110 initially starts scanning in the window having the initial size, such as a windows Wi1 in FIG. 14. The clustering unit 110 can expand the window having the initial size in a direction perpendicular to the crosswalk detection position having an angle of 170° initially in a window We1, that is, in a direction at angles of 80° and −100, and cluster the detection position, and the crosswalk detection position having the same angle of 170°, which is at distance away from such a position, as one cluster.

Then, the clustering unit 110 expands the window having the initial size in a direction perpendicular to the crosswalk detection position having an angle of 90° at the same position, that is, in a direction at 0° and a direction at 180° direction, and clusters the detection position, and the crosswalk detection position having the same angle of 90°, which is at a distance away from such a position, as one cluster.

Then, when the clustering unit 110 is scanning a position of a window Wi2, the size of the window returns to the initial size again. When the clustering unit 110 is scanning a position of a window We3, the crosswalk detection position having an angle of 100° enters the window, and the clustering unit 110 expands the window only in a direction at 10° and a direction at −170°, which are angles in a direction perpendicular to such an angle, and clusters the detection position, and the crosswalk detection position having the same angle of 100°, which is at a distance away from such a position, as one cluster.

Thus, the crosswalk detection position having an angle of 100° located on the upper side of the window We3 in FIG. 14 is not included in the window. This allows the clustering unit 110 erroneously clustering individual crosswalk detection positions, which are originally two positions, as one cluster to be avoided.

Further, when the clustering unit 110 is scanning a position of a window We4 in FIG. 14, the crosswalk detection position having an angle of 0° enters the window, and the clustering unit 110 expands the window in a direction at −90° and a direction at 90°, which are angles perpendicular to such an angle. This allows the crosswalk detection position having an angle of 0° separated due to a crosswalk partially hidden by passing vehicles to be clustered as one cluster.

Figure 15A:
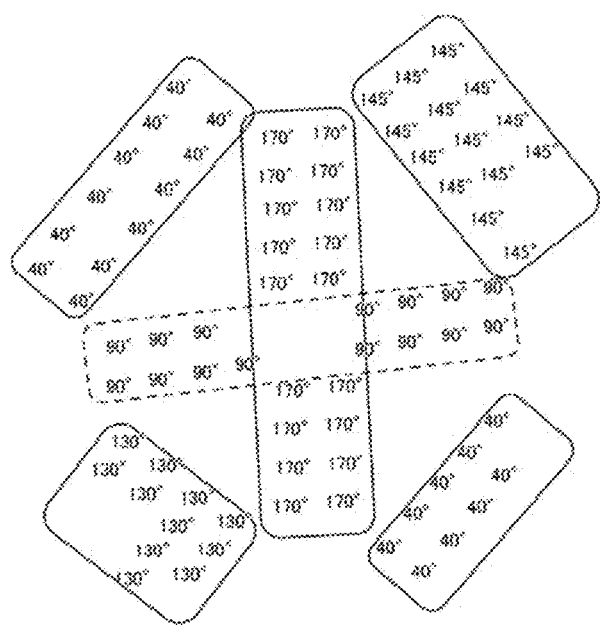
FIG. 15A is a diagram illustrating an example of a state in which clustering of crosswalk detection positions for the crosswalk $C_1$ has been completed.
Figure 15B:
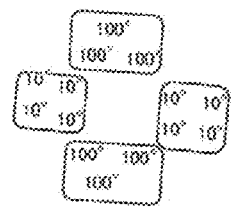
FIG. 15B is a diagram illustrating an example of a state in which clustering of crosswalk detection positions for the crosswalk $C_2$ has been completed.
Figure 15C:
FIG. 15C is a diagram illustrating an example of a state in which clustering of crosswalk detection positions for the crosswalk $C_3$ has been completed.

FIGS. 15A, 15B, and 15C are diagrams illustrating an example of a state in which clustering has been completed. Specifically, FIG. 15A is a diagram illustrating an example of a state in which clustering for a crosswalk detection position for a crosswalk $C_1$ has been completed. FIG. 15B is a diagram illustrating an example of a state in which clustering for a crosswalk detection position for a crosswalk $C_2$ has been completed. FIG. 15C is a diagram illustrating an example of a state in which clustering for a crosswalk detection position for a crosswalk $C_3$ has been completed. In FIGS. 15, 15B, and 15C, the crosswalk detection positions within a frame of the same type of lines are one cluster and match a crosswalk on an actual aerial photograph.

As described above, the crosswalk detection device according to the embodiment of the present invention calculates the angle-specific average value of the absolute values of the first derivative value and the second derivative value based on the crosswalk-specific line segment acquired from the digital aerial photograph, and detects a position at which there is the crosswalk based on a result of the calculation. This allows crosswalk information to be appropriately detected.

The present invention is not limited to the embodiments, and various modifications can be made without departing from the gist of the present invention in an implementing stage. Furthermore, the embodiments may be implemented in combination appropriately as long as it is possible, and in this case, combined effects can be obtained. Further, the above embodiments include inventions on various stages, and various inventions may be extracted by appropriate combinations of the disclosed multiple configuration requirements.

Further, a scheme described in each embodiment can be stored in a recording medium such as a magnetic disk (a Floppy (trade name) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software unit) that can be executed by a computing machine (a computer). Note that the program stored on the medium side includes a setting program for configuring, in a computing device, a software means (including not only an execution program but also a table and a data structure) to be executed by the computing device. The computing device which implements the present information processing device reads the program recorded in the recording medium, optionally builds the software means by the setting program, and executes the above-described processing by controlling the operation with the software means. Note that the recording medium referred to herein is not limited to a recording medium for distribution, but includes a storage medium such as a magnetic disk or a semiconductor memory provided in a computing machine or a device connected via a network.

REFERENCE SIGNS LIST

10 Crosswalk detection device
100 Aerial photograph storage unit
101 Roadway region mask storage unit
102 Image scanning unit
103 Multiple line segment creation unit
104 First derivative absolute value angle-specific average calculation unit
105 Second derivative absolute value angle-specific average calculation unit
106 Crosswalk determination unit
107 Second derivative minimum value maximum value angle difference determination unit
108 Minimum value angle comparison unit
109 First derivative value and second derivative value comparison unit
110 Clustering unit
111 Crosswalk data storage unit

The invention claimed is:

1. A crosswalk detection device comprising:
a processor,
wherein the processor is configured to
perform image scanning processing for scanning aerial image data in unit of window having a preset size,
perform multiple line segment creation processing for creating a plurality of line segments corresponding to a distance based on a dimension of a crosswalk in any direction within a region scanned in the window through the image scanning processing in the aerial image data,
perform first calculation processing for calculating an absolute value of a first derivative value indicating a difference in brightness between both ends of each of the plurality of line segments created through the multiple line segment creation processing and calculating an average value of the absolute value of the first derivative value for each angle of a line segment of the plurality of line segments,
perform second calculation processing for calculating an absolute value of a second derivative value indicating a difference between a difference in brightness between a first end of the line segment and an intermediate point of the line segment and a difference in brightness between the intermediate point and a second end of the line segment for each of the plurality of line segments created through the multiple line segment creation processing, and calculating an average value of the absolute value of the second derivative value for each angle of the line segment, and
perform crosswalk determination processing for determining that coordinates of each of the plurality of line segments created through the multiple line segment creation processing are coordinates of the crosswalk based on calculation results of the first and second calculation processing.

2. The crosswalk detection device according to claim 1, wherein the processor is configured to, as the crosswalk determination processing,
perform minimum value angle comparison processing for comparing an angle of a minimum value of the average value of the absolute value of the first derivative value calculated through the first calculation processing with an angle of a minimum value of the average value of the absolute value of the second derivative value calculated through the second calculation processing,
perform angle difference determination processing for determining a difference between the angle of the minimum value of the average value of the absolute value of the second derivative value and an angle of a maximum value of the average value of the absolute value of the second derivative value calculated through the second calculation processing, and
determine that, when the angle of the minimum value of the average value of the absolute value of the first derivative value and the angle of the minimum value of the average value of the absolute value of the second derivative values are the same as a result of the comparison in the minimum value angle comparison processing and the difference determined through the angle difference determination processing is 90 degrees, the coordinates of the line segment created through the multiple line segment creation processing are coordinates of the crosswalk.

3. The crosswalk detection device according to claim 1, wherein the processor is configured to, as the crosswalk determination processing, determine that, when the angle of the minimum value of the average value of the absolute value of the first derivative value calculated through the first calculation processing and the angle of the minimum value of the average value of the absolute value of the second derivative value calculated through the second calculation processing are the same, the angle is an angle corresponding to a direction of a striped pattern of the crosswalk.

4. The crosswalk detection device according to claim 1, wherein the processor is configured to, as the image scanning processing, set only a region of a roadway in the aerial image data as a scanning target.

5. The crosswalk detection device according to claim 1, wherein the processor is configured to perform clustering processing for scanning, after a determination of a plurality of coordinates of the crosswalk in the crosswalk determination processing, the plurality of coordinates of the crosswalk in unit of the window, and regarding, when the plurality of coordinates of the crosswalk corresponding to the plurality of line segments of a striped pattern forming the same angle enter the region scanned in the window, a crosswalk represented by the plurality of coordinates as one crosswalk.

6. The crosswalk detection device according to claim 2, wherein the processor is configured to, as the crosswalk determination processing,
   perform minimal value maximal value comparison processing for comparing the angle of a minimal value of the average value of the absolute value of the first derivative value calculated through the first calculation processing with the angle of a maximal value of the average value of the absolute value of the second derivative value calculated through the second calculation processing, and
   determine that, when the angle of the minimum value of the average value of the absolute value of the first derivative value and the angle of the minimum value of the average value of the absolute value of the second derivative values are the same as a result of the comparison in the minimum value angle comparison processing, the difference determined through the angle difference determination processing is 90 degrees, and the angle of the minimal value of the average value of the absolute value of the first derivative value and the angle of the maximal value of the average value of the absolute value of the second derivative value are the same as a result of the comparison in the minimal value maximal value comparison processing, the coordinates of the line segment created through the multiple line segment creation processing are coordinates of the crosswalk.

7. The crosswalk detection device according to claim 5, wherein the processor is configured to, as the clustering processing, expand a size of the window in a direction at an angle of the plurality of line segments of the striped pattern corresponding to the coordinates of the crosswalk entering the region scanned in the window, and regard, when a plurality of coordinates of the crosswalk corresponding to the line segments of the striped pattern forming the same angle enter the region scanned in the window that is expanded, a crosswalk represented by the plurality of coordinates as one crosswalk.

8. A crosswalk detection method performed by a crosswalk detection device including a processor, the crosswalk detection method comprising:
   performing, by the processor, processing of scanning aerial image data in unit of window having a preset size;
   performing, by the processor, processing of creating a plurality of line segments corresponding to a distance based on a dimension of a crosswalk in any direction within a region scanned in the window in the aerial image data;
   performing, by the processor, processing of calculating an absolute value of a first derivative value indicating a difference in brightness between both ends of the line segment for each of the plurality of created line segments and calculating an average value of the absolute value of the first derivative value for each angle of the line segment;
   performing, by the processor, processing of calculating an absolute value of a second derivative value indicating a difference between a difference in brightness between a first end of the line segment and an intermediate point of the line segment and a difference in brightness between the intermediate point and a second end of the line segment for each of the plurality of created line segments, and calculating an average value of the absolute value of the second derivative value for each angle of the line segment; and
   performing, by the processor, processing of determining that coordinates of each of the plurality of created line segments are coordinates of the crosswalk based on calculation results of the average value of the absolute value of the first derivative value and calculation results of the average value of the absolute value of the second derivative value.

9. A non-transitory computer-readable medium having computer-executable instructions that, upon execution of the instructions by a processor of a computer, cause the computer to
   perform image scanning processing for scanning aerial image data in unit of window having a preset size,
   perform multiple line segment creation processing for creating a plurality of line segments corresponding to a distance based on a dimension of a crosswalk in any direction within a region scanned in the window through the image scanning processing in the aerial image data,
   perform first calculation processing for calculating an absolute value of a first derivative value indicating a difference in brightness between both ends of each of the plurality of line segments created through the multiple line segment creation processing and calculating an average value of the absolute value of the first derivative value for each angle of a line segment of the plurality of line segments,
   perform second calculation processing for calculating an absolute value of a second derivative value indicating a difference between a difference in brightness between a first end of the line segment and an intermediate point of the line segment and a difference in brightness between the intermediate point and a second end of the line segment for each of the plurality of line segments created through the multiple line segment creation processing, and calculating an average value of the absolute value of the second derivative value for each angle of the line segment, and
   perform crosswalk determination processing for determining that coordinates of each of the plurality of line segments created through the multiple line segment creation processing are coordinates of the crosswalk based on calculation results of the first and second calculation processing.

* * * * *